Nov. 16, 1937.   H. A. McCORDOCK   2,099,072
REPEATING BACK FOR CAMERAS
Filed Aug. 20, 1935   2 Sheets-Sheet 1
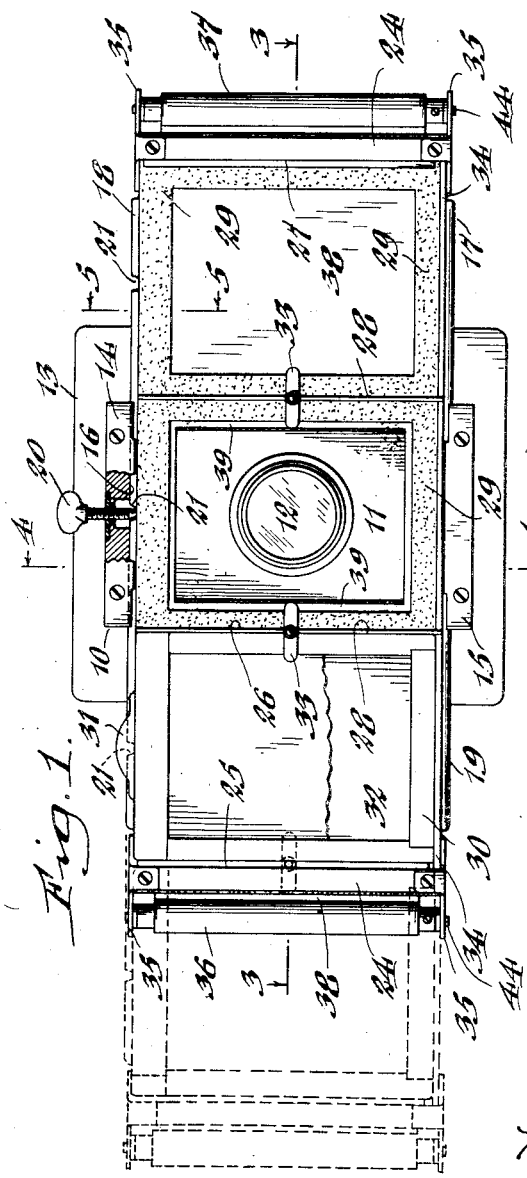
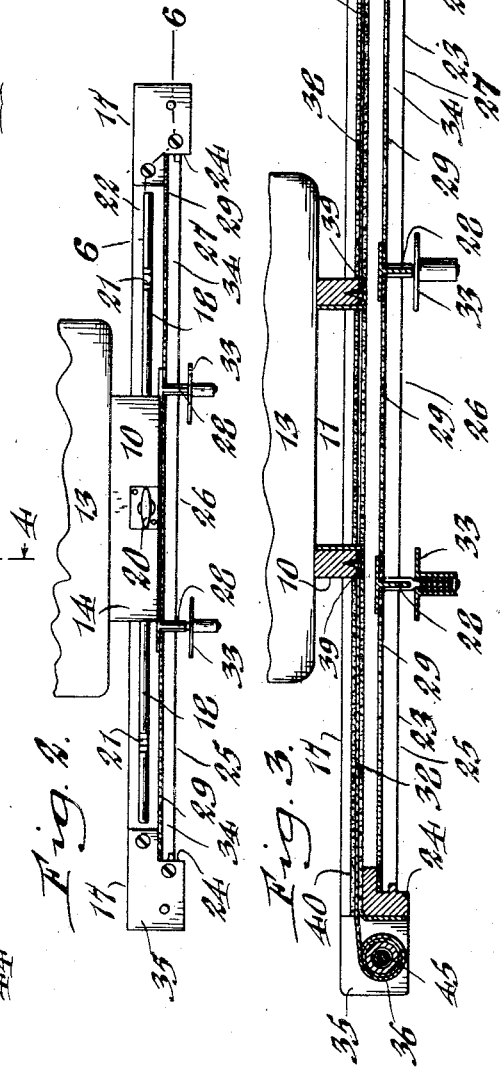
Inventor,
Howard A. McCordock,
by Walter P. Guyer
Attorney.

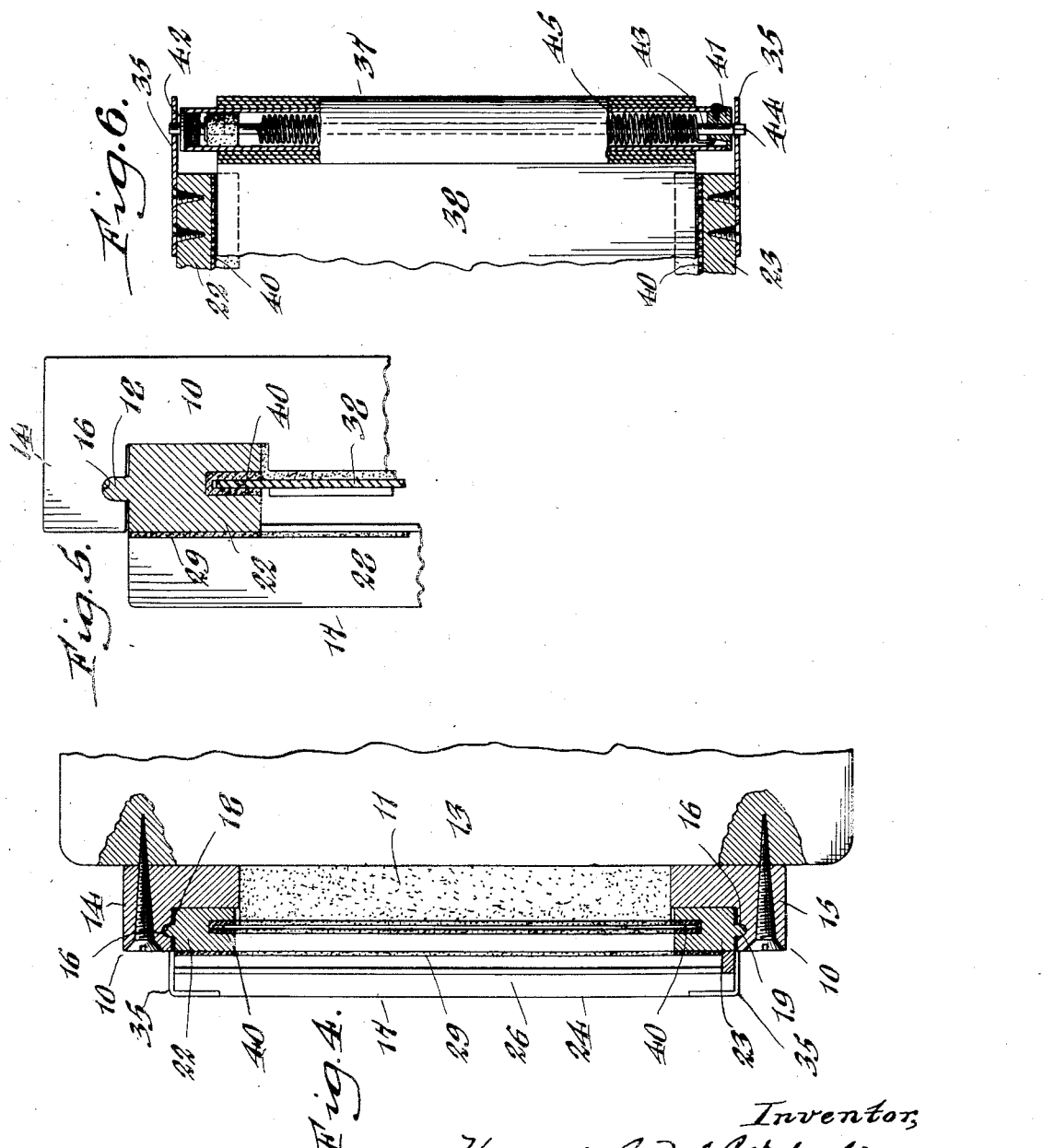

Patented Nov. 16, 1937

2,099,072

UNITED STATES PATENT OFFICE 2,099,072

REPEATING BACK FOR CAMERAS

Howard A. McCordock, Webster Groves, Mo.

Application August 20, 1935, Serial No. 37,011

9 Claims. (Cl. 95—2)

My invention relates generally to an attachment for cameras but more particularly to a repeating back which facilitates the making of color separation negatives for the three color process.

One of the objects is the provision of a compact roller blind repeating back which can be operated readily and accurately with a minimum of time and whose operation will not upset the focal or other adjustments of the camera.

A still further object is to provide an opaque flexible blind construction whose overall length is reduced to a minimum and yet completely protects the plates not being exposed while they extend beyond either side of the camera.

In the accompanying drawings:

Figure 1 is a front elevational view partly in section of my invention. Figure 2 is a top plan view of the same. Figure 3 is a horizontal sectional view taken on line 3—3, Figure 1. Figure 4 is an enlarged transverse vertical section taken on line 4—4, Figure 1. Figure 5 is an enlarged fragmentary section taken on line 5—5, Figure 1. Figure 6 is a fragmentary horizontal sectional view taken substantially on line 6—6, Figure 2, showing the construction of the blind rollers.

Similar characters of reference indicate corresponding parts throughout the several views.

By way of example, my invention is shown as comprising a rectangular anchoring frame or wall 10 having a central exposure opening 11 in registry with the focusing window 12 of a photographic camera 13. As shown, the rear rectangular frame 10 is securely fastened to the camera and comprises upper and lower cross bars 14, 15 having guide grooves 16 therein. A dark slide chassis or plate holder frame 17 is slidingly mounted on the anchoring frame and has upper and lower tongues 18, 19 slidingly engaging the grooves 16 thus permitting the plate holder frame to shift laterally either side of the camera and relatively to its focusing window. A stop or catch preferably in the form of a thumb screw 20 threaded through the upper cross bar 14 extends downwardly to engage suitable spaced notches 21 in the upper tongue 18 to latch the sliding plate holder frame 17 in any of three registering positions as clearly shown in Figure 1. This sliding frame 17 is skeleton-like in structure having upper and lower members 22, 23 and end walls 24 of substantially L-shape in cross section. Spaced equal distances apart to form three openings or compartments 25, 26 and 27 are upright partitions 28. The outer face of the plate holder frame 17 is preferably covered with velvet or plush 29 to exclude light between the sliding plate holder frame 17 and the anchoring frame 10, as seen in Figure 1. Detachably inserted in each opening or compartment 25, 26 and 27 of the sliding frame is a plate holder 30 provided with dark slide blinds 31 and a light filter 32 of the desired color whereby the colored rays may be transferred to the plate in the holder. The plate holder is securely held in its companion compartment by spring pressed turn clamps 33 mounted on the partitions 28 and a bottom stop strip 34 fixed to the lower member 23 of the sliding frame.

Mounted on end brackets 35 at both ends of the sliding frame 17 are blind-carrying rollers 36, 37 about which are wound flexible blinds of opaque fabricoid 38 or like light-excluding material. The free ends of the blinds are securely fastened to the anchoring frame 10 by clamping plates 39 or other appropriate means. The flexible blinds are disposed behind the plate holders 30 to exclude any light from attacking those plates not exposed and in register with the camera-opening 12, and to this end their upper and lower marginal edges are inserted and guided in plush covered ways or grooves 40 in the upper and lower members 21, 22 of the sliding plate holder frame 17, as shown in Figure 5.

The blind-carrying rollers 36, 37 may, for example, be constructed of tubing, each closed at one end by a plug 41 and the other end by a screw cap 42. Extending centrally through each roller is a shaft 43 having a squared end 44 seated in the end brackets 35. A spring 45 is applied to the shaft and is fastened at one end to the plug 41 and at its other end to said shaft 43, whereby each roller is constantly urged in a direction to wind up its blind and maintain the same firm, smooth and taut.

The tension of the springs in the two blind-rollers 36, 37 is preferably unequal, the spring 45 in the roller 36 being wound tighter than the one in the companion roller 37. When the attachment is pushed to the left, viewing Figure 1, both rollers turn clockwise, the right hand roller 37 winding up its blind while the left hand blind is pulled or unrolled from its roller 36 as the latter recedes from the anchoring frame 10. This unrolling of the left hand blind winds the spring of the left hand roller to full tension, so that when the back is as far to left as it will go, it is then in position for the first exposure and is retained in its different positions by the latch screw 20, the spring in the left hand roller 36 serving the additional function of propelling the sliding frame 17 automatically to the right to successively bring its plates to exposure position.

In the operation of the device when it is desired to take three color pictures of a person or object, the sliding frame 17 is pushed to the left hand side of the camera, viewing Figure 1, and latched in position by the thumb screw 20. The dark slides or plates are loaded in the compartments 25, 26 and 27, secured in place by the turn clamps 33, and the customary slide blinds 31 are then removed. After the first exposure has been made the right hand is placed against the right hand end of the sliding frame 17, and the thumb screw 20 released from the engaging notch 21, allowing the frame 17, due to the greater tension of the spring 45 in left hand blind-roller 36 to slowly slide toward the right until the thumb screw will fit into the next succeeding notch to properly set the back for the exposure of the next plate. After the second plate has been exposed the third plate is brought into position and exposed in a similar manner. With a revolving camera back, the apparatus can be placed vertically with the left hand roller 36 uppermost and the slide chassis dropped into position for the last two exposures.

This improved repeating back structure, while enabling the three negatives to be quickly and conveniently taken, is manifestly compact and easily manipulated, and furthermore, its design is such that its overall length is reduced to a minimum and yet affords complete protection to those plates not exposed while extending beyond either side of the camera. In fact, by my improvement embodying the flexible roller blinds, the overall length of the repeating back is reduced over the customary rigid back from a few inches more than five times the width of an individual dark slide to approximately three times the same dimension.

I claim as my invention:—

1. A photographic device of the character described, comprising a wall having an exposure opening therein, a frame slidably mounted on said wall and having a plurality of openings adapted to register successively with the exposure-opening in said wall and adapted to receive plate-holders, and flexible light-excluding means arranged to extend over those frame-openings not in register with the exposure-opening, said means being attached at one end to the adjoining side of said wall and movably connected at its other end to the corresponding end of said slidable frame.

2. A photographic device of the character described, comprising a wall having an exposure opening therein, a frame slidably mounted on said wall and having a plurality of openings adapted to register successively with the exposure-opening in said wall and adapted to receive plate-holders, revolving supports disposed at the opposite ends of said slidable frame, and flexible light-excluding blinds arranged to extend over those frame-openings not in register with the exposure-opening, each of said blinds being connected at one end to the corresponding side of said wall and at its other end to the companion revolving support.

3. A photographic device of the character described, comprising a wall having an exposure opening therein, a frame slidably mounted on said wall and having a plurality of openings adapted to register successively with the exposure-opening in said wall and adapted to receive plate-holders, revolving supports disposed at the opposite ends of said slidable frame, flexible light-excluding blinds arranged to extend over those frame-openings not in register with the exposure-opening, each of said blinds being connected at one end to the corresponding side of said wall and at its other end to the companion revolving support, and spring means applied to said revolving supports and tending to wind up said blinds in response to the sliding movement of the frame in one direction or the other to expose a given frame-opening to said exposure-opening.

4. A photographic device of the character described, comprising a wall having an exposure opening therein, a frame slidably mounted on said wall and having a plurality of openings adapted to register successively with the exposure-opening in said wall and adapted to receive plate-holders, flexible light-excluding means arranged to extend over those frame-openings not in register with the exposure-opening and movable in response to the movements of said slidable frame, and means for holding said frame in position with one of its openings in register with the exposure-opening.

5. A photographic device of the character described, comprising a stationary wall having an exposure opening therein, a frame slidably mounted on said wall and having a plurality of openings adapted to register successively with the exposure opening and adapted to receive plate-holders, and flexible light-excluding members attached at one end to one of said frame elements and having roller connections at their opposite ends to the other frame element, whereby as the slidable frame is moved to expose and bring one of its openings in register with the exposure opening the light-excluding members are accordingly wound or unwound to cover the remaining openings.

6. A photographic device of the character described, comprising a wall having an exposure opening therein, a frame slidably mounted on said wall and having a central opening and end openings therein to register successively with said exposure opening and adapted to receive plate-holders, rollers supported at the ends of said frame and having spring means tending to rotate them in one direction, and light-excluding blinds adapted to extend over those frame-openings not in register with the exposure opening and connected at one end to said wall and at their opposite ends to said rollers, respectively, one of said rollers winding up its blind and the companion roller unwinding its blind during a movement of the sliding frame in one direction, whereby a previously exposed plate-opening is covered and a previously covered plate-opening is exposed.

7. A photographic device of the character described, comprising a wall having an exposure opening therein, a frame slidably mounted on said wall and having a central opening and end openings therein to register successively with said exposure opening and adapted to receive plate-holders, rollers supported at the ends of said frame and having spring means tending to rotate them in one direction, light-excluding blinds adapted to extend over those frame-openings not in register with the exposure opening and connected at one end to said wall and at their opposite ends to said rollers, respectively, and releasable stop means for maintaining the sliding frame in a given position of plate-exposure.

8. A photographic device of the character described, comprising a wall having an exposure opening therein, a frame slidably mounted on said wall and having a central opening and end openings therein to register successively with said exposure opening and adapted to receive plate-holders, rollers supported at the ends of said frame and having spring means tending to rotate them in one direction, and light-excluding blinds adapted to extend over those frame-openings not in register with the exposure opening and connected at one end to said wall and at their opposite ends to said rollers, respectively, one of said spring means being of a greater tension than the other and tending to urge the frame in one direction.

9. A photographic device of the character described, comprising a wall having an exposure opening therein, a frame slidably mounted on said wall and having a plurality of openings adapted to register successively with the exposure-opening in said wall and adapted to receive plate-holders, revolving supports disposed at the opposite ends of said slidable frame, flexible light-excluding blinds arranged to extend over those frame-openings not in register with the exposure-opening, each of said blinds being connected at one end to the corresponding side of said wall and at its other end to the companion revolving support, and guide-ways in said frame for receiving the marginal edges of said blinds to guide the latter and exclude the passage of light between said frame and said blinds.

HOWARD A. McCORDOCK.